(12) United States Patent
Uchiike (10) Patent No.: US 8,823,347 B2
(45) Date of Patent: Sep. 2, 2014

(54) VOLTAGE BOOSTING/LOWERING CIRCUIT AND VOLTAGE BOOSTING/LOWERING CIRCUIT CONTROL METHOD

(75) Inventor: Takeshi Uchiike, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 362 days.

(21) Appl. No.: 13/298,920

(22) Filed: Nov. 17, 2011

(65) Prior Publication Data

US 2012/0126769 A1     May 24, 2012

(30) Foreign Application Priority Data

Nov. 18, 2010   (JP) .................................. 2010-257951

(51) Int. Cl.
*G05F 1/40*     (2006.01)
(52) U.S. Cl.
USPC ........................................................ 323/282
(58) Field of Classification Search
USPC .......... 323/222, 259, 268, 271, 282, 284, 285
See application file for complete search history.

(56) References Cited

U.S. PATENT DOCUMENTS

| | | | | |
|---|---|---|---|---|
| 5,705,919 | A * | 1/1998 | Wilcox | 323/282 |
| 6,304,066 | B1 * | 10/2001 | Wilcox et al. | 323/282 |
| 6,853,174 | B1 * | 2/2005 | Inn | 323/285 |
| 6,980,445 | B2 * | 12/2005 | Fukumoto et al. | 363/45 |
| 7,075,277 | B2 * | 7/2006 | Ishii et al. | 323/259 |
| 7,362,083 | B2 * | 4/2008 | Scoones et al. | 323/299 |
| 7,646,185 | B2 * | 1/2010 | Kim | 323/283 |
| 7,777,462 | B2 * | 8/2010 | Kudo et al. | 323/272 |
| 7,994,762 | B2 * | 8/2011 | de Cremoux et al. | 323/271 |
| 8,411,397 | B2 * | 4/2013 | Akama | 361/18 |
| 2007/0075687 | A1 | 4/2007 | Ishii et al. | |
| 2009/0022339 | A1 * | 1/2009 | Sasaki | 381/121 |
| 2011/0101944 | A1 | 5/2011 | Uchiike | |
| 2013/0088208 | A1 * | 4/2013 | Noda | 323/271 |

FOREIGN PATENT DOCUMENTS

| | | |
|---|---|---|
| JP | 2004-208448 A | 7/2004 |
| JP | 2007-097361 A | 4/2007 |
| JP | 2009-124844 A | 6/2009 |
| JP | 2009-296747 A | 12/2009 |

OTHER PUBLICATIONS

M. Gaboriault, et al., "A high efficiency, noninverting, buck-boost DC-DC converter", Applied Power Electronics Conference and Exposition, Sep. 27, 2004, pp. 1411-1415, Nineteenth Annual IEEE, vol. 3.
Japanese Office Action issued Jun. 24, 2014 in corresponding Japanese Patent Application No. 2010-257951.

* cited by examiner

*Primary Examiner* — Adolf Berhane
(74) *Attorney, Agent, or Firm* — Sughrue Mion, PLLC (57) ABSTRACT

A voltage boosting/lowering circuit according to an aspect of the present invention includes an output voltage generation circuit 15 that includes a switch element 2 connected between an input terminal 1 and a choke coil 3 and a switch element 7 connected between the choke coil 3 and a ground, and generates an output voltage by switching the switch elements 2 and 7 between an on-state and an off-state and thereby boosting/lowering an input voltage input to the input terminal 1, a first switch control unit that outputs a first pulse signal to the switch element 2, a duty detection circuit 32 that detects a duty of the first pulse signal, and a second switch control unit that outputs a second pulse signal to the switch element 7 according to the detected duty.

12 Claims, 9 Drawing Sheets

Fig. 9E t101 t102 t103 t104     TIME t

VOLTAGE BOOSTING/LOWERING CIRCUIT AND VOLTAGE BOOSTING/LOWERING CIRCUIT CONTROL METHOD

CROSS-REFERENCE TO RELATED APPLICATIONS

This application is based upon and claims the benefit of priority from Japanese patent application No. 2010-257951, filed on Nov. 18, 2010, the disclosure of which is incorporated herein in its entirety by reference.

BACKGROUND

The present invention relates to a voltage boosting/lowering circuit and a voltage boosting/lowering circuit control method. In particular, the present invention relates to a voltage boosting/lowering circuit and a voltage boosting/lowering circuit control method using switch control.

In recent years, as the power consumption of digital still camera sets (hereinafter, simply called "camera sets") has been reduced in order to extend their battery life span, voltage boosting/lowering circuits have been used in power-supply circuits that supplies an electrical power to microcomputers and the likes. The reason for this trend is explained hereinafter. The power supply voltage of microcomputers installed in camera sets is 3.3 V, and lithium-ion secondary batteries are commonly used as the power supply of such camera sets. Usually, a single lithium-ion secondary battery outputs a voltage of 4.2 V at the maximum. The output voltage of a lithium-ion secondary battery decreases as its electrical power is consumed. Further, the battery life span of a lithium-ion secondary battery can be extended by using the battery until its output voltage decreases to a lower voltage (for example, 1.5 V). Therefore, in order to obtain a power supply voltage of 3.3 V for a microcomputer as the power supply of a camera set by using a single lithium-ion secondary battery, it is necessary to perform, by a power-supply circuit, a voltage boosting conversion when the output voltage of the lithium-ion secondary battery is in a range between 1.5 V and 3.3 V and perform a voltage lowering conversion when the output voltage is in a range between 3.3 V to 4.2 V. Further, for such voltage boosting/lowering circuits installed in camera sets, the demand for improving the power efficiency has been growing.

Japanese Unexamined Patent Application Publication No. 2009-296747 (Patent literature 1) discloses a technique aiming at reducing a power loss in which the reduction of the power loss is achieved by reducing the operating ratio of a voltage boosting circuit. The configuration of a power supply apparatus (voltage boosting/lowering circuit) disclosed in Patent literature 1 is explained with reference to FIG. 8. The power supply apparatus 123 shown in FIG. 8 has the following configuration. One end of a voltage source 101 is connected to one end of a first switching element 105 through an input terminal 102. The first switching element 105 is configured in such a manner that its on-off action is performed through an external signal, and uses a field-effect transistor(s) (hereinafter called "FET"). Further, a smoothing capacitor 104 is connected between the input terminal 102 and a ground terminal 103. Note that the ground terminal 103 of the power supply apparatus 123 is connected to the ground side of power system lines of the voltage source 101, a load 113, and the like.

Figure 8:
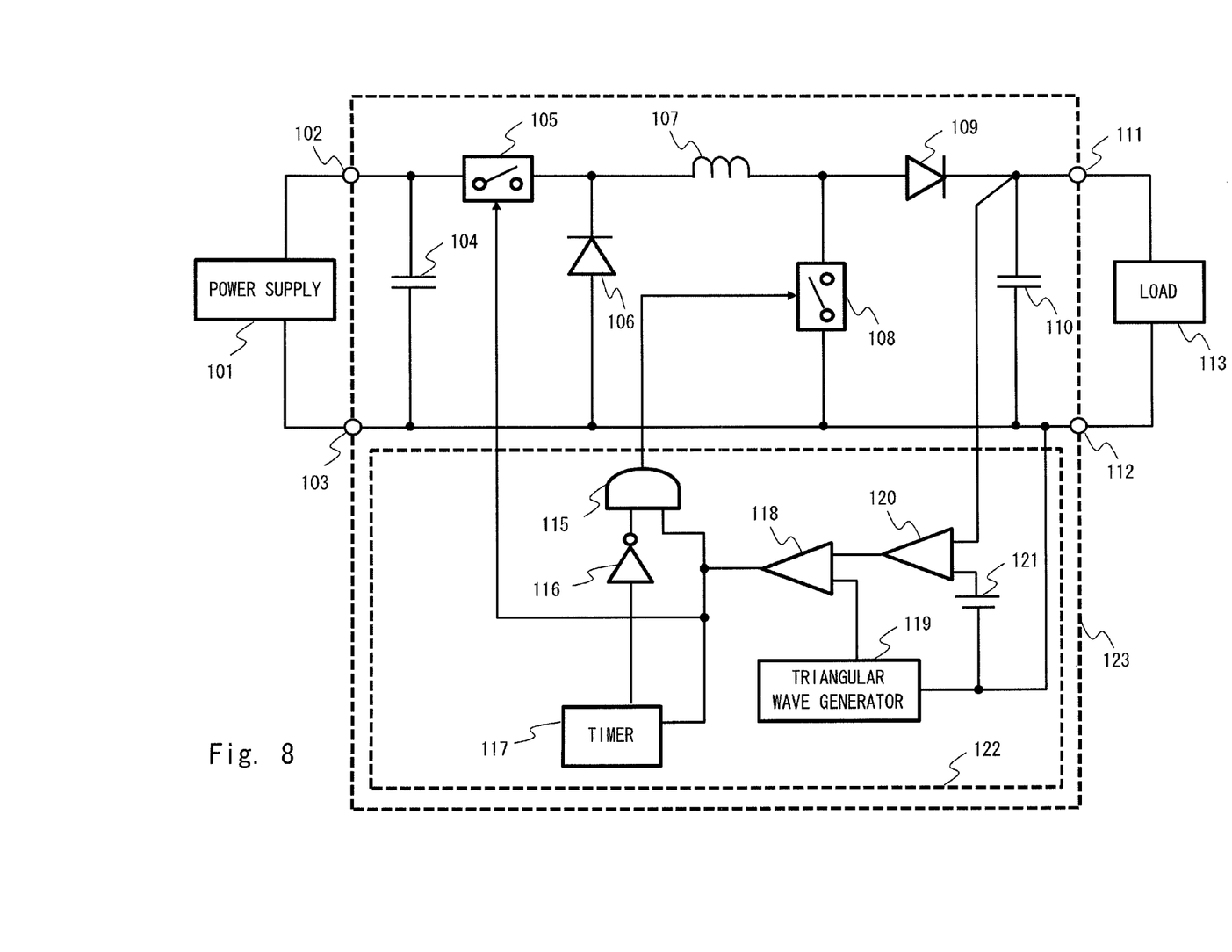
FIG. 8 is a configuration diagram of a power supply apparatus disclosed in Patent literature 1.

A first rectifying element 106 is connected between the other end of the first switching element 105 and the ground terminal 103. Therefore, the first rectifying element 106 is series-connected to the first switching element 105, and thus connected between the first switching element 105 and the other end of the voltage source 101. Note that the first rectifying element 106 is composed of a diode and connected in such a manner that its anode side is connected to the ground terminal 103 side.

One end of an inductance element 107 is connected to the node between the first switching element 105 and the first rectifying element 106. A second rectifying element 109 is connected between the other end of the inductance element 107 and the output terminal 111 of the power supply apparatus 123. Note that similarly to the first rectifying element 106, the second rectifying element 109 is composed of a diode and is connected in such a manner that its anode side is connected to the inductance element 107 side. Further, the output terminal 111 is connected to one end of the load 113. Therefore, the second rectifying element 109 is series-connected to the inductance element 107, and thus connected between the inductance element 107 and the one end of the load 113.

A second switching element 108 is connected between the node between the inductance element 107 and the second rectifying element 109 and a ground terminal 112. This ground terminal 112 is also connected to the above-mentioned ground terminal 103. Further, the other end of the load 113, i.e., the ground side of the load 113 is connected to the ground terminal 112. Therefore, the second switching element 108 is connected between the node between the inductance element 107 and the second rectifying element 109 and the other end of the load 113. Note that similarly to the first switching element 105, the second switching element 108 is composed of a FET(s). Further, a smoothing capacitor 110 is connected between the output terminal 111 and the ground terminal 112. A control circuit 122, which turns on/off the first switching element 105 and the second switching element 108, is connected to these switching elements through control system lines. Further, a control system line that takes in the voltage at the output terminal 111 (hereinafter called "output voltage Vo") is also connected to the power supply apparatus 123 so that the power supply apparatus 123 can output a stable voltage to the load 113. Furthermore, the ground side of the control circuit 122 is also connected to the ground terminal 112.

The detailed configuration and the operation of each part of the control circuit 122 are explained hereinafter. Firstly, the output voltage Vo is input to an error amplifier 120 provided inside the control circuit 122. Meanwhile, a reference voltage from a reference voltage source 121 is also input to the error amplifier 120. Therefore, the error amplifier 120 amplifies and outputs the difference of the actual output voltage Vo from the reference voltage. The output of the error amplifier 120 is input to a PWM comparator 118.

Meanwhile, a triangular wave having a predetermined cycle generated by a triangular wave generator 119 is also input to the PWM comparator 118. Note that the predetermined cycle of the triangular wave may be determined as appropriate so that the required voltage boosting/lowering characteristic is obtained. In this way, the PWM comparator 118 generates an on-off signal SW1 having an on-off cycle T and an on-time ratio D that are determined according to the output of the error amplifier 120. This on-off signal SW1 is output to the first switching element 105. Therefore, the first switching element 105 performs an on-off action with the on-time ratio D. Note that the on-time ratio D is defined to be the ratio of an on-period of the first switching element 105 to the on-off cycle T.

Further, the output of the PWM comparator 118 is input to one of the input terminals of an AND circuit 115 and also input to the other input terminal of the AND circuit 115 through a timer 117 and an inverting circuit 116. The AND circuit 115 obtains the logical product of both input signals and outputs the result to the second switching element 108. With the configuration like this, an on-off signal SW2 output to the second switching element 108 behaves in the following manner.

Firstly, the waveform that is directly input from the PWM comparator 118 to the AND circuit 115 is identical with the above-described on-off signal SW1 of the first switching element 105. Meanwhile, the timer 117 outputs an on-signal for a predetermined period tx starting at the moment when the output of the PWM comparator 118 becomes an on-state. The output signal X from the timer 117 is inverted by the inverting circuit 116 and then input to the AND circuit 115. Therefore, the output of the inverting circuit 116 is in an off-state for the predetermined period tx and becomes an on-state signal at all other times.

According to these input signals from the PWM comparator 118 and the inverting circuit 116, the AND circuit 115 outputs an on-signal only when both input signals are in an on-state. Therefore, the output of the inverting circuit 116 becomes an off-state at the moment when the PWM comparator 118 outputs an on-signal. Therefore, the output of the AND circuit 115 remains in the off-state. After that, when the predetermined period tx has elapsed, the output of the AND circuit 115 becomes an on-state. Therefore, the output of the AND circuit 115 becomes identical with the output of the PWM comparator 118 at that time. The output of the AND circuit 115 described above is used as the on-off signal SW2 of the second switching element 108.

Figure 9A:
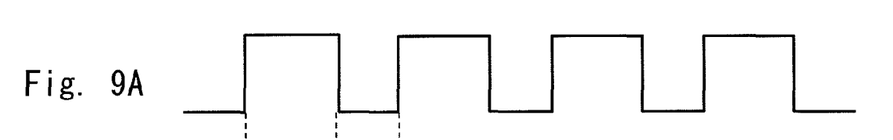
FIGS. 9A to 9E are a graph for explaining an operation of a power supply apparatus disclosed in Patent literature 1.
Figure 9B:
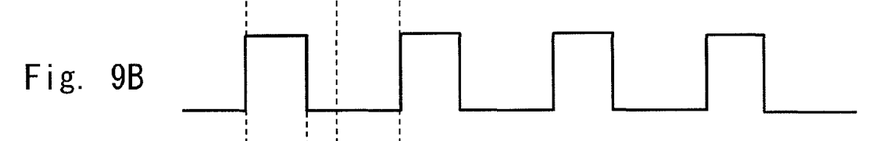
Figure 9C:
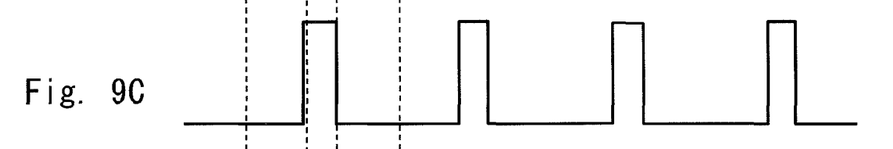
Figure 9D:
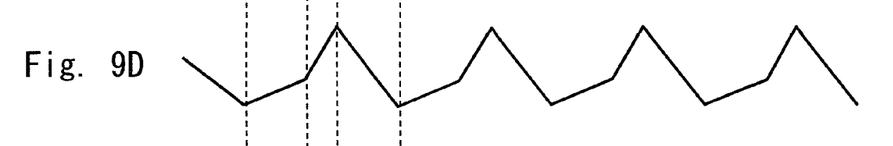
Figure 9E:
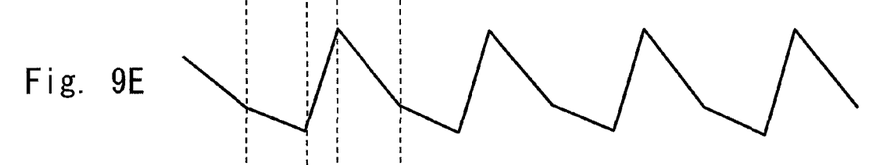

Next, the operation of the above-described power supply apparatus 123 is explained with reference to FIG. 9. Note that FIG. 9A shows a waveform chart of the on-off signal of the first switching element 105. FIG. 9B shows a waveform chart of the output signal of the timer 117. FIG. 9C shows a waveform chart of the on-off signal of the second switching element 108. FIG. 9D shows a waveform chart of the current of the inductance element 107 when Vi>Vo. Further, FIG. 9E shows a waveform chart of the current of the inductance element 107 when Vi<Vo. Therefore, in these charts, the horizontal axis represents time t. Further, FIG. 9 shows a case where the on-time ratio D is large.

A case where the on-time ratio D is large is explained. As shown in FIG. 9A, assume that the on-off signal SW1 of the first switching element 105 becomes an on-state at a time t101. At this point, the output of the PWM comparator 118 becomes an on-signal. Therefore, in response to this, the timer 117 starts outputting an on-signal as shown in FIG. 9B. Since this output signal X is inverted by the inverting circuit 116, an off-signal is input to the AND circuit 115 at the time t101. Therefore, the output of the AND circuit 115, i.e., the on-off signal SW2 of the second switching element 108 remains in the off-state at the time t101 as shown in FIG. 9C in spite of the output of the PWM comparator 118.

Since only the first switching element 105 is in the on-state at the time t101 as described above, the voltage source 101 is connected to the load 113 through the inductance element 107 and the second rectifying element 109. At this point, when the relation between the input voltage Vi and the output voltage Vo is "Vi>Vo", the current I flowing through the inductance element 107 increases over time as shown in FIG. 9D, whereas when the relation is "Vi<Vo", the current I decreases over time as shown in FIG. 9E. In either case, since the current I is positive, the current I is supplied to the load 113. At this point, since the second switching element 108 is in the off-state, the loss in the power supply apparatus 123 is small.

After that, when the predetermined period tx has elapsed from the time t101, i.e., at a time t102, the timer 117 outputs an off-signal as shown in FIG. 9B. At this point, since FIG. 9 shows the case where the on-time ratio D is large, the first switching element 105 remains in the on-state as shown in FIG. 9A. Therefore, the signal input from the PWM comparator 118 to the AND circuit 115 remains in the on-state.

Meanwhile, when the output signal X of the timer 117 becomes an off-state, the output of the inverting circuit 116 becomes an on-state and this signal is input to the AND circuit 115. Therefore, since the on-signals are input to both inputs of the AND circuit 115, the output signal of the AND circuit 115 becomes an on-state. Therefore, at the time t102, the second switching element 108 is turned on as shown in FIG. 9C, and the current I of the inductance element 107 increases as shown in FIGS. 9D and 9E. As a result, the voltage boosting ratio Vo/Vi of the power supply apparatus 123 becomes larger as described later, though the internal loss in the second switching element 108 increases.

After that, at a time t103, the on-period, which is determined by the on-time ratio D of the first switching element 105, has ended, and the first switching element 105 is turned off as shown in FIG. 9A. As a result, since the AND circuit 115 outputs an off-signal, the second switching element 108 is also turned off as shown in FIG. 9C. Therefore, at the time t103, the first switching element 105 and the second switching element 108 are simultaneously turned off.

As a result, the electric power of the inductance element 107 is supplied to the load 113. Therefore, as shown in FIG. 9D, the current I of the inductance element 107 decreases over time at and after the time t103. Note that since the first switching element 105 and the second switching element 108 are both in the off-state at this point, no internal loss occurs in these switching elements. After that, at a time t104, the same action as that at the time t101 is performed, and after that, the same actions as those from the time t101 to t104 are repeated.

SUMMARY

The present inventors have found the following problem. In the case where the on-time ratio D of the first switching element 105 shown in FIG. 8 is large, if the power supply apparatus 123 is to output an output voltage Vo higher than the input voltage Vi, it is necessary to increase the on-time ratio D2 of the second switching element 108. Further, when the power supply apparatus 123 outputs an output voltage Vo higher than the input voltage Vi and the load current is large, it is necessary to further increase the on-time ratio D2 to a value higher than the value that is used when the load current is small.

Assume a case where the on-time ratio D2 is set so that the power supply apparatus 123 can output an output voltage Vo higher than the input voltage Vi and supply a large load current to the load 113. Further, this on-time ratio D2 is represented as "on-time ratio D2a". In the case where the on-time ratio D2 is set to D2a, i.e., "D2=D2a", when the load current is large, the internal loss in the power supply apparatus 123 does not increase because the on-time ratio D2a is the on-time ratio of the second switching element 108 required for the power supply apparatus 123 to supply the output voltage Vo and the load current.

However, in the power supply apparatus 123, when the load current decreases in the state where the on-time ratio D2 is set to a large value as expressed as "on-time ratio D2=on-time ratio D2a" as described above, the on-time ratio D2 does not change according to the change in the load current. Therefore, the internal loss in the power supply apparatus 123 increases.

That is, the voltage boosting operation is performed even when the voltage boosting operation is unnecessary. Assume that the on-time ratio D2 of the second switching element 108 that the power supply apparatus 123 requires to supply the output voltage Vo when the load current decreases is represented as "on-time ratio D2*b*". Then, there has been a problem that since the relation between the on-time ratio D2*a* and the on-time ratio D2*b* is "D2*a*>D2*b*", a power loss occurs because the power supply apparatus 123 performs a voltage boosting operation for a duration "[(D2*a*−D2*b*)×on-off cycle T]".

A first aspect of the present invention is a voltage boosting/lowering circuit including: an output voltage generation circuit including a first switch element connected between an input terminal and one end of a choke coil, and a second switch element connected between another end of the choke coil and a ground terminal, the output voltage generation circuit being configured to generate an output voltage by switching the first and second switch elements between an on-state and an off-state and thereby boosting or lowering an input voltage input to the input terminal; a first switch control unit that outputs a first pulse signal to the first switch element, the first pulse signal being used to switch the first switch element between an on-state and an off-state; a duty detection circuit that detects a duty ratio of the first pulse signal; and a second switch control unit that outputs a second pulse signal to the second switch element, the second pulse signal being used to switch the second switch element between an on-state and an off-state according to the detected duty ratio.

By using the voltage boosting/lowering circuit like this, it is possible to detect the duty of the first pulse signal. Therefore, it is possible to control the output of the second pulse signal to the second switch element according to the detected duty. In this way, it is possible to control the voltage boosting operation and the voltage lowering operation according to the duty.

Another aspect of the present invention is a control method of a voltage boosting/lowering circuit including a first switch element connected between an input terminal and one end of a choke coil, and a second switch element connected between another end of the choke coil and a ground terminal, the control method including: outputting a first pulse signal to the first switch element, the first pulse signal being used to switch the first switch element between an on-state and an off-state; detecting a duty of the first pulse signal; and outputting a second pulse signal to the second switch element, the second pulse signal being used to switch the second switch element between an on-state and an off-state according to the detected duty.

By using the voltage boosting/lowering circuit like this, it is possible to detect the duty of the first pulse signal. Therefore, it is possible to control the output of the second pulse signal to the second switch element according to the detected duty. In this way, it is possible to control the voltage boosting operation and the voltage lowering operation according to the duty.

According to the present invention, it is possible to provide a voltage boosting/lowering circuit and a voltage boosting/lowering circuit control method capable of performing a voltage boosting operation and a voltage lowering operation without increasing the internal loss.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Embodiments according to the present invention are explained hereinafter with reference to the drawings. A configuration example of a voltage boosting/lowering circuit according to a first embodiment of the present invention is explained with reference to FIG. 1. The voltage boosting/lowering circuit shown in FIG. 1 includes an input terminal 1, a transistor 2, a choke coil 3, a resistor 4, flywheel diodes 5 and 6, a transistor 7, a capacitor 8, resistors 9 and 10, an output terminal 11, a switch control unit 12, a clock generation circuit 13, a selector 26, and a duty detection circuit 32. A circuit composed of the input terminal 1, the transistor 2, the choke coil 3, the resistor 4, the flywheel diodes 5 and 6, the transistor 7, the capacitor 8, the resistors 9 and 10, and the output terminal 11 is referred to as "output voltage generation circuit 15".

Figure 1:
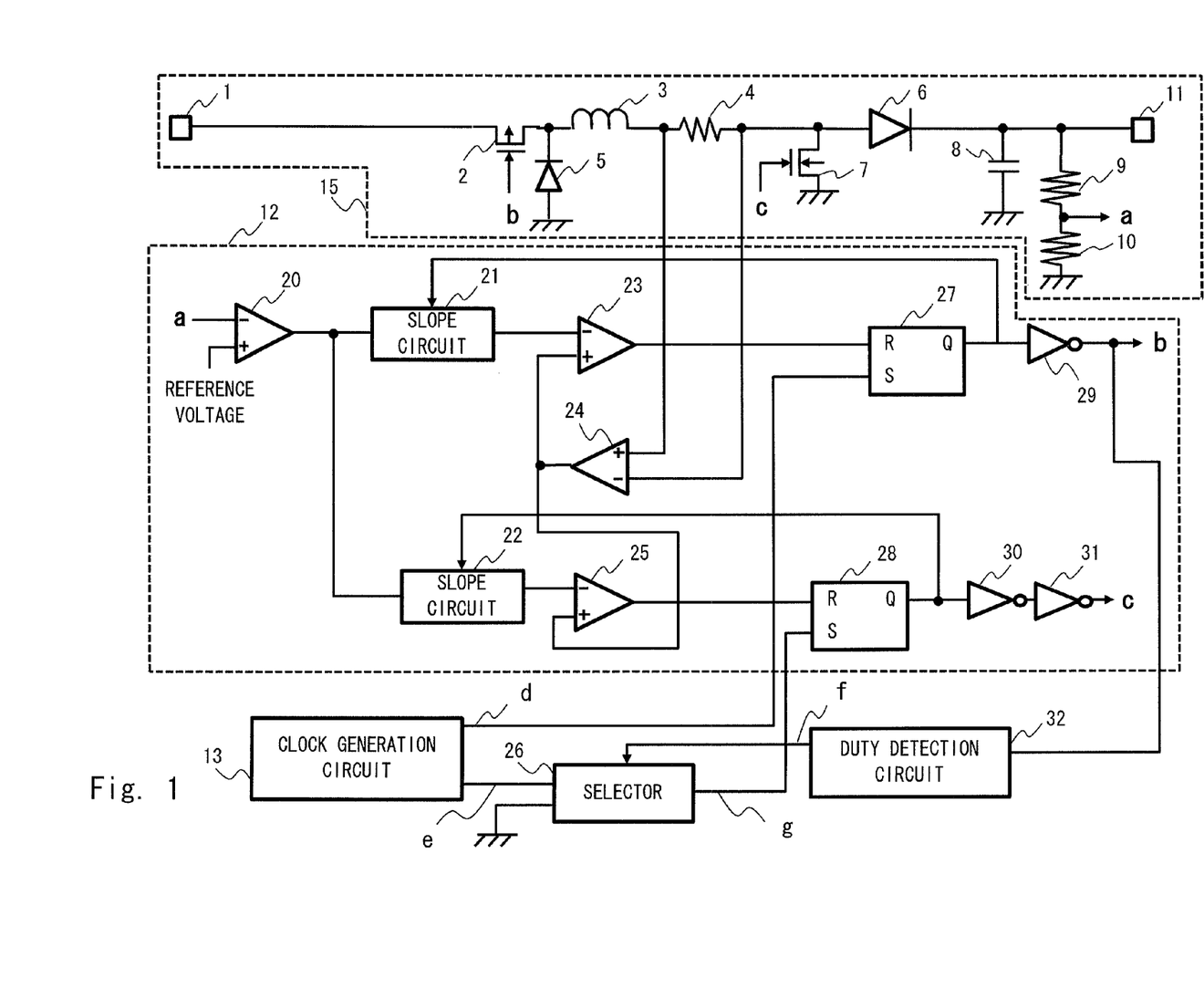
FIG. 1 is a configuration diagram of a voltage boosting/lowering circuit according to a first embodiment of the present invention.

An input voltage Vi is input to the input terminal 1. The transistor 2, which is a switch element, is connected between the input terminal 1 and the choke coil 3. When the transistor 2 becomes an on-state, the input terminal 1 and the choke coil 3 becomes a conduction state, and the input voltage Vi is thereby applied to one end of the choke coil 3.

When the input voltage Vi is applied, the choke coil 3 accumulates energy of $L \times I^2/2$. L represents the inductance of the choke coil 3 and I represents the current generated in the coil. The flywheel diode 5 is connected between one end of the choke coil 3 and the ground in order to rectify the current generated in the choke coil 3. The resistor 4 is connected to the terminal of the choke coil 3 that is different from the terminal connected to the transistor 2. The resistor 4 converts the current generated in the choke coil 3 into a voltage and outputs the voltage to the switch control unit 12, which is connected across the resistor 4.

The transistor 7, which is a switch element, is connected between a terminal of the resistor 4 and the ground terminal. Note that the transistor 7 is connected to the terminal of the resistor 4 that is different from the terminal connected to the choke coil 3. When the transistor 7 becomes an on-state, one end of the choke coil 3 is set to the ground potential through the resistor 4 and the transistor 7.

The flywheel diode 6 outputs the current generated in the choke coil 3 to the capacitor 8. The resistors 9 and 10 divide an output voltage output from the output terminal 11 and output the resultant voltage to the switch control unit 12. The clock generation circuit 13 generates a clock for lowering voltage (hereinafter called "voltage lowering clock", represented symbol "d") and a clock for boosting voltage (hereinafter called "voltage boosting clock", represented symbol "e") having different timings from each other, and outputs the voltage lowering clock and the voltage boosting clock to the switch control unit 12 and the selector 26 respectively. The selector 26 generates a set signal for boosting voltage (hereinafter called "voltage boosting set signal", represented symbol "g") by selecting either the voltage boosting clock or an L-level signal (ground potential), and outputs the generated voltage boosting set signal to the switch control unit 12.

The switch control unit 12 outputs a PWM signal, which is generated based on the voltage lowering clock, the voltage boosting set signal, the voltage obtained by dividing the output voltage by the resistors 9 and 10, and the voltage occurring in the resistor 4, to the transistor 2, the transistor 7, and the duty detection circuit 32. The PWM signal is used to control the switching of the transistor 2 and the transistor 7 between an on-state and an off-state. The duty detection circuit 32 receives the PWM signal to be input to the transistor 2. The duty detection circuit 32 detects the duty of the PWM signal and outputs the detection result to the selector 26 as a duty detection signal (represented symbol "f"). The selector 26 receives the voltage boosting clock and the L-level signal, and outputs one of these input signals to the switch control unit 12 under the control of the duty detection circuit 32.

Next, a detailed configuration example of the switch control unit 12 is explained. The switch control unit 12 includes an error amplifier 20, SLOPE circuits 21 and 22, a comparator 23, a current detection circuit 24, a comparator 25, RS latches 27 and 28, and inverters 29 to 31. The SLOPE circuit 21, the comparator 23, and the RS latch 27, and the inverter 29 form a voltage lowering control circuit. Meanwhile, the SLOPE circuit 22, the comparator 25, and the RS latch 28, and the inverters 30 and 31 form a voltage boosting control circuit.

The error amplifier 20 receives a reference voltage at a plus terminal side and receives the divided voltage "a" divided by the resistors 9 and 10 at a minus terminal side as a feedback voltage. In the figure, the feedback voltage is represented by a symbol "a". The reference voltage is determined based on a target output voltage output from the output terminal 11. Letting Vg stand for the target output voltage, the reference voltage is defined as "αVg" (α is an appropriate coefficient). Further, assume that the voltage output from the output terminal 11 is represented as "Vo"; the resistance value of the resistor 9 is represented as "R9"; and the resistance value of the resistor 10 is represented as "R10". Then, the feedback voltage can be defined as "Vo×R10/(R9+R10)". The switch control unit 12 performs control so that the feedback voltage gets closer to the reference voltage αVg. The error amplifier 20 outputs a voltage value obtained by amplifying a difference between αVg and Vo×R10/(R9+R10) to the SLOPE circuits 21 and 22. Each of the SLOPE circuits 21 and 22 generates a voltage that is based on the voltage output from the error amplifier 20 and has a constant slope. That is, each of the SLOPE circuits 21 and 22 decreases the voltage output from the error amplifier 20 over time. The SLOPE circuit 21 outputs the generated voltage to the comparator 23 and the SLOPE circuit 22 outputs the generated voltage to the comparator 25.

The comparator 23 compares the voltage output from the SLOPE circuit 21 with the voltage output from the current detection circuit 24, and outputs an H-level signal or an L-level signal to the RS latch 27 according to the comparison result. The voltage output from the current detection circuit 24 is the voltage generated by the current flowing through the resistor 4. When the voltage output from the SLOPE circuit 21 is lower than the voltage output from the current detection circuit 24, the comparator 23 outputs an H-level signal to the RS latch 27. On the other hand, when the voltage output from the SLOPE circuit 21 is higher than the voltage output from the current detection circuit 24, the comparator 23 outputs an L-level signal to the RS latch 27.

The comparator 25 compares the voltage output from the SLOPE circuit 22 with the voltage output from the current detection circuit 24, and outputs an H-level signal or an L-level signal to the RS latch 28 according to the comparison result. When the voltage output from the SLOPE circuit 22 is lower than the voltage output from the current detection circuit 24, the comparator 25 outputs an H-level signal to the RS latch 28. On the other hand, when the voltage output from the SLOPE circuit 22 is higher than the voltage output from the current detection circuit 24, the comparator 25 outputs an L-level signal to the RS latch 28.

The RS latch 27 receives the H-level signal or the L-level signal output from the comparator 23 at an RS reset terminal. Further, the RS latch 27 receives the voltage lowering clock output from the clock generation circuit 13 at a set terminal. Similarly to the RS latch 27, the RS latch 28 receives the H-level signal or the L-level signal output from the comparator 25 at a reset terminal. Further, the RS latch 28 receives the voltage boosting clock output from the selector 26 at a set terminal. The RS latch 27 generates an H-level signal or an L-level signal by using the signals received at the set and reset terminals. Then, the RS latch 27 outputs the H-level signal or the L-level signal to the SLOPE circuit 21 and the inverter 29. The operation of the SLOPE circuit 21 based on the signal output from the RS latch 27 will be described later in detail. Similarly to the RS latch 27, the RS latch 28 generates an H-level signal or an L-level signal by using the signals received at the set and reset terminals. Then, the RS latch 28 outputs the H-level signal or the L-level signal to the SLOPE circuit 22 and the inverter 30.

The inverter 29 inverts the H-level signal or the L-level signal received from the RS latch 27 and outputs the inverted signal to the transistor 2. The signal output from the inverter 29 to the transistor 2 is referred to as "voltage lowering PWM signal" and is represented by a symbol "b" in the figure. Further, the transistor 2 is a PMOS transistor. Therefore, when an L-level signal is output from the inverter 29 to the transistor 2, the transistor 2 becomes an on-state. Further, when an H-level signal is output from the inverter 29 to the transistor 2, the transistor 2 becomes an off-state.

The inverter 30 inverts the H-level signal or the L-level signal received from the RS latch 28 and outputs the inverted signal to the inverter 31. The inverter 31 inverts the received signal and outputs the inverted signal to the transistor 7. The signal output from the inverter 31 to the transistor 7 is referred to as "voltage boosting PWM signal" and is represented by a symbol "c" in the figure. Further, the transistor 7 is an NMOS transistor. Therefore, when an H-level signal is output from the inverter 31 to the transistor 7, the transistor 7 becomes an on-state. Further, when an L-level signal is output from the inverter 31 to the transistor 7, the transistor 7 becomes an off-state.

Figure 2:
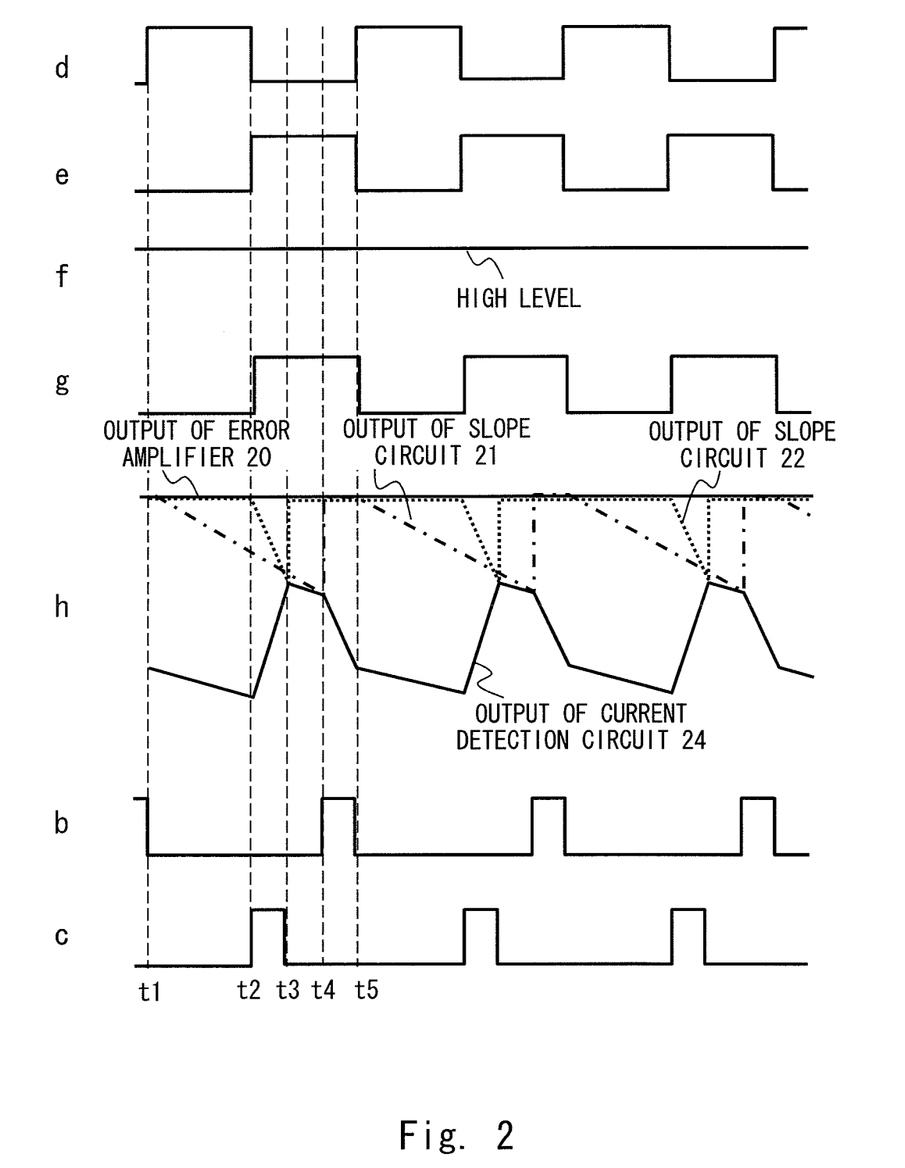
FIG. 2 is a graph for explaining an operation of a voltage boosting/lowering circuit according to a first embodiment of the present invention.

Next, an operation of a voltage boosting/lowering circuit according to the first embodiment of the present invention is explained with reference to FIG. 2. Specifically, an operation of a voltage boosting/lowering circuit according to the first embodiment of the present invention in which the input voltage Vi is close to the output voltage Vo is explained. Symbols "d" and "e" in FIG. 2 represent output states of the voltage lowering clock and the voltage boosting clock respectively. A symbol "f" in FIG. 2 represents an output state of the duty detection signal. A symbol "g" in FIG. 2 represents an output state of the voltage boosting set signal. A symbol "h" in FIG. 2 represents output voltages of the error amplifier 20, the SLOPE circuit 21, the SLOPE circuit 22, and the current detection circuit 24 inside the switch control unit 12. Symbols "b" and "c" in FIG. 2 represent output states of the voltage lowering PWM signal and the voltage boosting PWM signal output to the transistor 2 and the transistor 7 respectively. Further, FIG. 2 shows a case where the duty of the low width of the voltage lowering PWM signal is 95%.

The duty detection circuit 32 outputs an H-level signal to the selector 26 when the duty of the low width of the voltage lowering PWM signal is larger than 90%, and outputs an L-level signal to the selector 26 when the duty of the low width of the voltage lowering PWM signal is smaller than 90%. Since FIG. 2 shows a case where the duty of the low width of the voltage lowering PWM signal is 95%, the duty detection circuit 32 outputs an H-level signal to the selector 26. The value that is used when the duty detection circuit 32 detects the duty of the low width of the voltage lowering PWM signal is not limited to 90%, and any value larger than 0% and no larger than 100% can be selected for that value.

The selector 26 outputs the voltage boosting clock to the RS latch 28 when the duty detection signal is an H-level signal, and outputs the L-level signal to the RS latch 28 when the duty detection signal is an L-level signal. Since the duty detection signal is an H-level in FIG. 2, the selector 26 outputs the voltage boosting clock to the RS latch 28.

The clock generation circuit 13 outputs the voltage lowering clock and the voltage boosting clock. The voltage lowering clock and the voltage boosting clock have the same frequency and an arbitrary phase difference therebetween.

When the voltage lowering clock rises, the output of the RS latch 27 is set to an H-level signal and the voltage lowering PWM signal, which is the inverted signal of the output of the RS latch 27, falls (time t1 and t5). The SLOPE circuit 21 outputs, only for a period in which the voltage lowering PWM signal is an L-level signal, a voltage that starts at the output voltage of the error amplifier 20 and steadily falls with a constant slope. As the voltage output from the SLOPE circuit 21 steadily falls, the potential between the voltage output from the SLOPE circuit 21 and the voltage output from the current detection circuit 24 is reversed. As a result, the output of the comparator 23 becomes an H-level signal and the RS latch 27 is thereby reset.

As the RS latch 27 is reset, the RS latch 27 outputs an L-level signal and the voltage lowering PWM signal, which is output to the transistor 2 through the inverter 29, rises (time t4) Further, the SLOPE circuit 21 stops the falling action at the timing at which the voltage lowering PWM signal rises, and outputs the voltage output from the error amplifier 20. The SLOPE circuit 21 detects that the signal output from the RS latch 27 changes from the H-level to the L-level. In this way, the SLOPE circuit 21 can obtain the rising or falling timing of the voltage lowering PWM signal.

Next, when the voltage boosting set signal rises, the output of the RS latch 28 is set to an H-level signal and the voltage boosting PWM signal rises (time t2). The SLOPE circuit 22 outputs, only for a period in which the voltage boosting PWM signal is an H-level signal, a voltage that starts at the output voltage of the error amplifier 20 and steadily falls with a constant slope. Note that the SLOPE circuits 21 and 22 are configured so that the voltage falling slope in the SLOPE circuit 22 is steeper than the voltage falling slope in the SLOPE circuit 21. As the voltage output from the SLOPE circuit 22 steadily falls, the potential between the voltage output from the SLOPE circuit 22 and the voltage output from the current detection circuit 24 is reversed. As a result, the output of the comparator 25 becomes an H-level signal and the RS latch 28 is thereby reset.

As the RS latch 28 is reset, the RS latch 28 outputs an L-level signal and the voltage boosting PWM signal, which is output to the transistor 7 through the inverters 30 and 31, falls (time t3). Further, the SLOPE circuit 22 stops the falling action at the timing at which the voltage boosting PWM signal falls, and outputs the voltage output from the error amplifier 20. The SLOPE circuit 22 can obtain the falling timing of the voltage boosting PWM signal by detecting the change of the signal output from the RS latch 28 from the H-level to the L-level.

Further, as shown in FIG. 2, by changing timings of the voltage lowering clock and the voltage boosting clock from each other, i.e., by changing their phases from each other, it is possible to change the falling timing of the voltage lowering PWM signal and the rising timing of the voltage boosting PWM signal from each other. Further, the voltage boosting PWM signal is raised from an L-level signal to an H-level signal and then dropped from the H-level signal to an L-level signal within the period in which the voltage lowering PWM signal is an L-level signal. Further, the voltage lowering PWM signal is raised from an L-level signal to an H-level signal and then dropped from the H-level signal to an L-level signal within the period in which the voltage boosting PWM signal is an L-level signal. The slopes with which the voltages are steadily lowered in the SLOPE circuits 21 and 22 or the phase difference between the voltage boosting clock and the voltage lowering clock is determined so that the PWM signals behave in the above-described manner.

With the above-described operation, during the period between the time t1 and the time t2, the transistor 2 becomes an on-state and the transistor 7 becomes an off-state. As a result, the current is generated in the choke coil 3 and energy is accumulated in the choke coil 3. The total voltage of the input voltage Vi and the voltage generated by the energy accumulated in the choke coil 3 is applied to the flywheel diode 6. Further, the flywheel diode 6 becomes a forward bias state, and discharging to the capacitor 8 is carried out. Further, during the period between the time t2 and the time t3, the transistor 2 becomes an on-state and the transistor 7 also becomes an on-state. Therefore, one end of the choke coil 3 is set to the ground potential through the transistor 7 and the resistor 4. As a result, the input voltage Vi is entirely applied to the choke coil 3 and the current flowing to the choke coil 3 thereby increases. Therefore, the energy accumulated in the choke coil 3 further increases. In this state, during the period between the time t3 and the time t4, when the transistor 2 becomes an off-state, the total voltage of the input voltage Vi and the voltage generated by the energy accumulated in the choke coil 3 is applied to the input-side terminal of the flywheel diode 6 connected to the choke coil 3. Further, the flywheel diode 6 becomes a forward bias state, and discharging to the capacitor 8 is carried out. The above-described operation is a voltage boosting operation by which the input voltage Vi is raised.

During the period between the time t4 and the time t5, since the transistor 2 becomes an off-state, the input voltage Vi is no longer applied to the choke coil 3. Further, the transistor 7 also becomes an off-state. As a result, only the voltage generated by the energy accumulated in the choke coil 3 is applied to the input-side terminal of the flywheel diode 6, and discharging to the capacitor 8 is carried out. Therefore, in comparison to the period between the time t3 and the time t4, the input voltage Vi is eliminated and a voltage lowering operation is thereby carried out. At and after the time t5, the above-described operation is repeated.

As described above, when the input voltage Vi is close to the output voltage Vo, control is performed in such a manner that voltage boosting/lowering operations are repeated so that the desired output voltage Vo is obtained.

Figure 3:
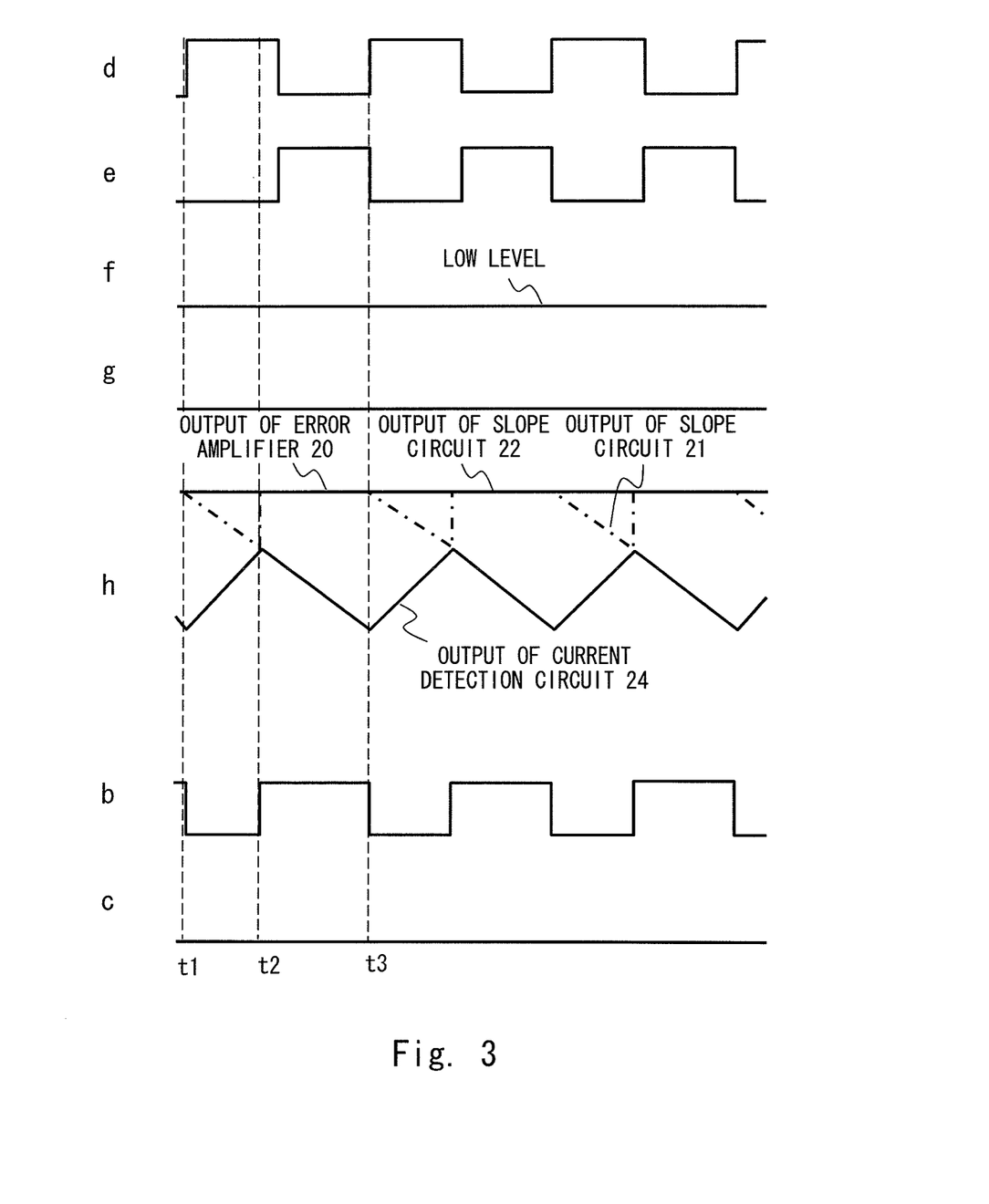
FIG. 3 is a graph for explaining an operation of a voltage boosting/lowering circuit according to a first embodiment of the present invention.

Next, an operation of a voltage boosting/lowering circuit according to the first embodiment of the present invention is explained with reference to FIG. 3. Specifically, an operation in which the input voltage Vi is sufficiently higher than the output voltage Vo is explained. The explanation of waveforms represented by symbols "b" to "h" in FIG. 3 is the same as that for the waveforms "b" to "h" in FIG. 2. When the input voltage Vi is sufficiently high, the duty of the low width of the voltage lowering PWM signal is adjusted to a value sufficiently smaller than 90% by the PWM control of the circuit composed of the error amplifier 20, the SLOPE circuit 21, the comparator 23, the current detection circuit 24, the RS latch 27, and the inverter 29. Therefore, the output of the duty detection circuit 32 becomes an L-level signal. Since the duty detection signal is the L-level signal, the selector 26 outputs an L-level signal to the RS latch 28. Since the L-level signal is input to the set terminal of the RS latch 28, the RS latch 28 outputs an L-level signal and the voltage boosting PWM signal becomes an L-level signal through the inverters 30 and 31.

Further, since the period in which the output of the RS latch 28 is an H-level signal does not exist, the SLOPE circuit 22 constantly outputs a voltage equal to the output voltage of the error amplifier 20 without performing the falling action. Since the relation of the output voltage of the SLOPE circuit 22 and the output voltage of the current detection circuit 24 is "(output voltage of SLOPE circuit 22)>(output voltage of the current detection circuit 24)", the comparator 25 outputs an L-level signal.

When the voltage lowering clock rises, the output of the RS latch 27 is set to an H-level signal and the voltage lowering PWM signal, which is the inverted signal of the output of the RS latch 27, falls (time t1 and t3). The SLOPE circuit 21 outputs, only for a period in which the voltage lowering PWM signal is an L-level signal, a voltage that starts at the output voltage of the error amplifier 20 and steadily falls with a constant slope. As the voltage output from the SLOPE circuit 21 steadily falls, the potential between the voltage output from the SLOPE circuit 21 and the voltage output from the current detection circuit 24 is reversed. As a result, the output of the comparator 23 becomes an H-level signal and the RS latch 27 is thereby reset.

As the RS latch 27 is reset, the RS latch 27 outputs an L-level signal and the voltage lowering PWM signal, which is output to the transistor 2 through the inverter 29, rises (time t2) Further, the SLOPE circuit 21 stops the falling action at the timing at which the voltage lowering PWM signal rises, and outputs the voltage output from the error amplifier 20. The SLOPE circuit 21 detects that the signal output from the RS latch 27 changes from the H-level to the L-level. In this way, the SLOPE circuit 21 can obtain the rising timing of the voltage lowering PWM signal. At and after the time t3, the above-described operation is repeated.

As described above, when the input voltage Vi is sufficiently higher than the output voltage Vo, it is possible to perform only the voltage lowering operation by detecting the duty of the voltage lowering PWM signal in the duty detection circuit. That is, the voltage boosting operation is never performed by the voltage boosting circuit.

Figure 4:
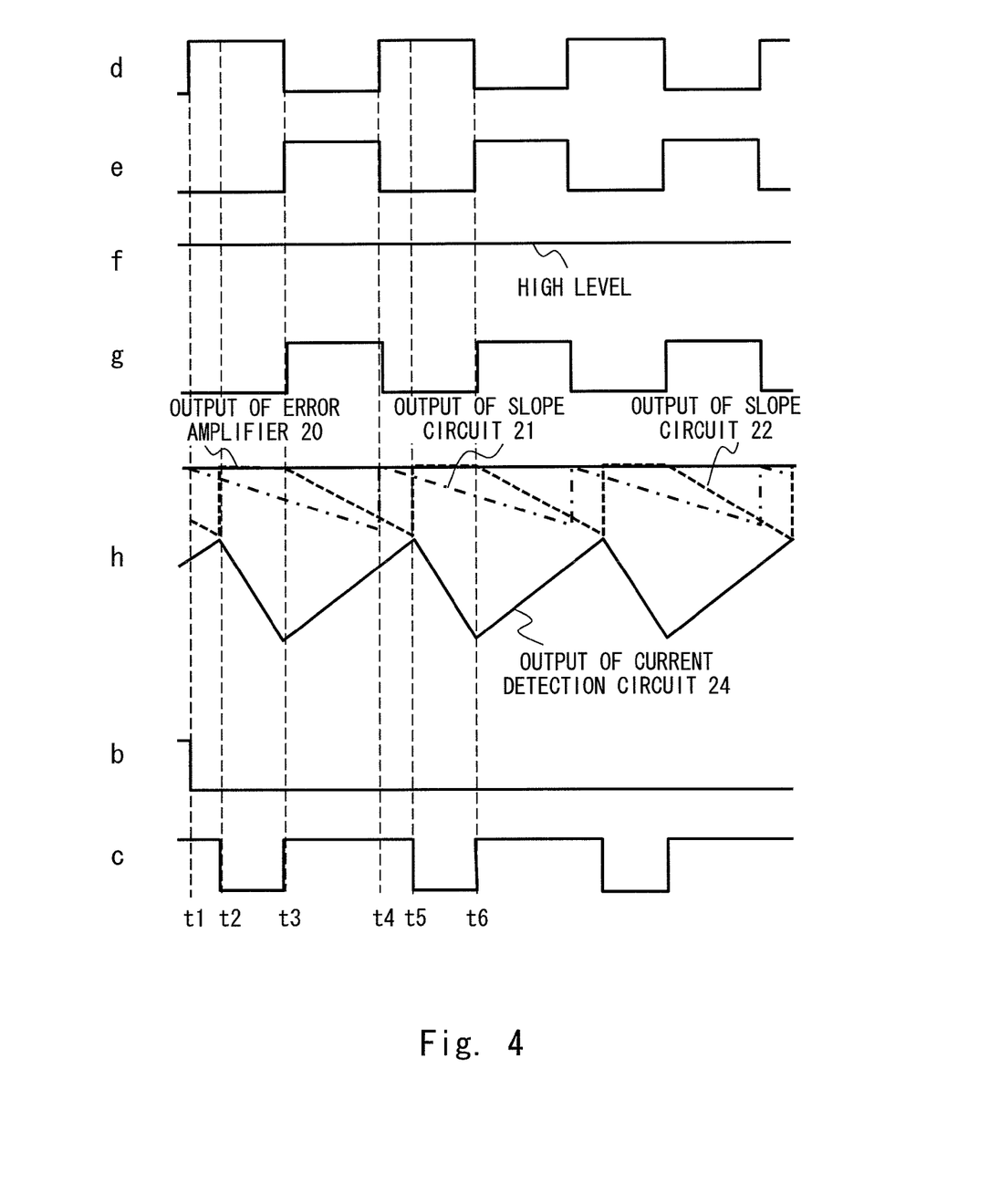
FIG. 4 is a graph for explaining an operation of a voltage boosting/lowering circuit according to a first embodiment of the present invention.

Next, an operation of a voltage boosting/lowering circuit according to the first embodiment of the present invention is explained with reference to FIG. 4. Specifically, an operation in which the input voltage Vi is sufficiently lower than the output voltage Vo is explained. The explanation of waveforms represented by symbols "b" to "h" in FIG. 4 is the same as that for the waveforms "b" to "h" in FIG. 2.

When the voltage lowering clock rises, the output of the RS latch 27 is set to an H-level signal and the voltage lowering PWM signal, which is the inverted signal of the output of the RS latch 27, falls (time t1). The SLOPE circuit 21 outputs, only for a period in which the voltage lowering PWM signal is an L-level signal, a voltage that starts at the output voltage of the error amplifier 20 and steadily falls with a constant slope.

However, the output voltage of the SLOPE circuit 21 does not continuously decrease for a period longer than one clock cycle of the voltage lowering clock. That is, the SLOPE circuit 21 stops the falling action at the next rising timing of the voltage lowering clock and outputs the voltage output from the error amplifier 20. Further, at the same time, the SLOPE circuit 21 starts the next falling action (time t1 and t4).

After the output of the RS latch 27 is set to an H-level signal at the time t1, the relation of the output voltage of the SLOPE circuit 21 and the output voltage of the current detection circuit 24 is "(output voltage of SLOPE circuit 21)>(output voltage of the current detection circuit 24)". Therefore, the comparator 23 outputs an L-level signal.

Accordingly, the RS latch 27 is not reset at and after the time t1 and the voltage lowering PWM signal remains at the L-level. As the voltage lowering PWM signal remains at the L-level, the duty of the low width of the voltage lowering PWM signal becomes 100%. Therefore, the duty detection circuit 32 outputs an H-level signal to the selector 26. Since the duty detection signal is at the H-level, the selector 26 outputs the voltage boosting clock to the RS latch 28.

Next, when the voltage boosting set signal rises, the output of the RS latch 28 is set to an H-level signal and the voltage boosting PWM signal rises (time t3 and t6). The SLOPE circuit 22 performs the falling action only for the period in which the voltage boosting PWM signal is at an H-level. That is, the SLOPE circuit 22 outputs, only for a period in which the voltage boosting PWM signal is an H-level signal, a voltage that starts at the output voltage of the error amplifier 20 and steadily falls with a constant slope. Note that the SLOPE circuits 21 and 22 are configured so that the voltage falling slope in the SLOPE circuit 22 is steeper than the voltage falling slope in the SLOPE circuit 21. As the voltage output from the SLOPE circuit 22 steadily falls, the potential between the voltage output from the SLOPE circuit 22 and the voltage output from the current detection circuit 24 is reversed. As a result, the output of the comparator 25 becomes an H-level signal and the RS latch 28 is thereby reset.

As the RS latch 28 is reset, the RS latch 28 outputs an L-level signal and the voltage boosting PWM signal, which is output to the transistor 7 through the inverters 30 and 31, falls (time t2 and t5). Further, the SLOPE circuit 22 stops the falling action at the timing at which the voltage boosting PWM signal falls, and outputs the voltage output from the error amplifier 20. The SLOPE circuit 22 can obtain the falling timing of the voltage boosting PWM signal by detecting the change of the signal output from the RS latch 28 from the H-level to the L-level. At and after the time t6, the operations in the time t3 to t6 are repeated.

As described above, when the input voltage Vi is sufficiently lower than the output voltage Vo, it is possible to perform only the voltage boosting operation by detecting the duty of the voltage lowering PWM signal in the duty detection circuit. That is, the voltage lowering operation is never performed by the voltage lowering circuit.

Figure 5:
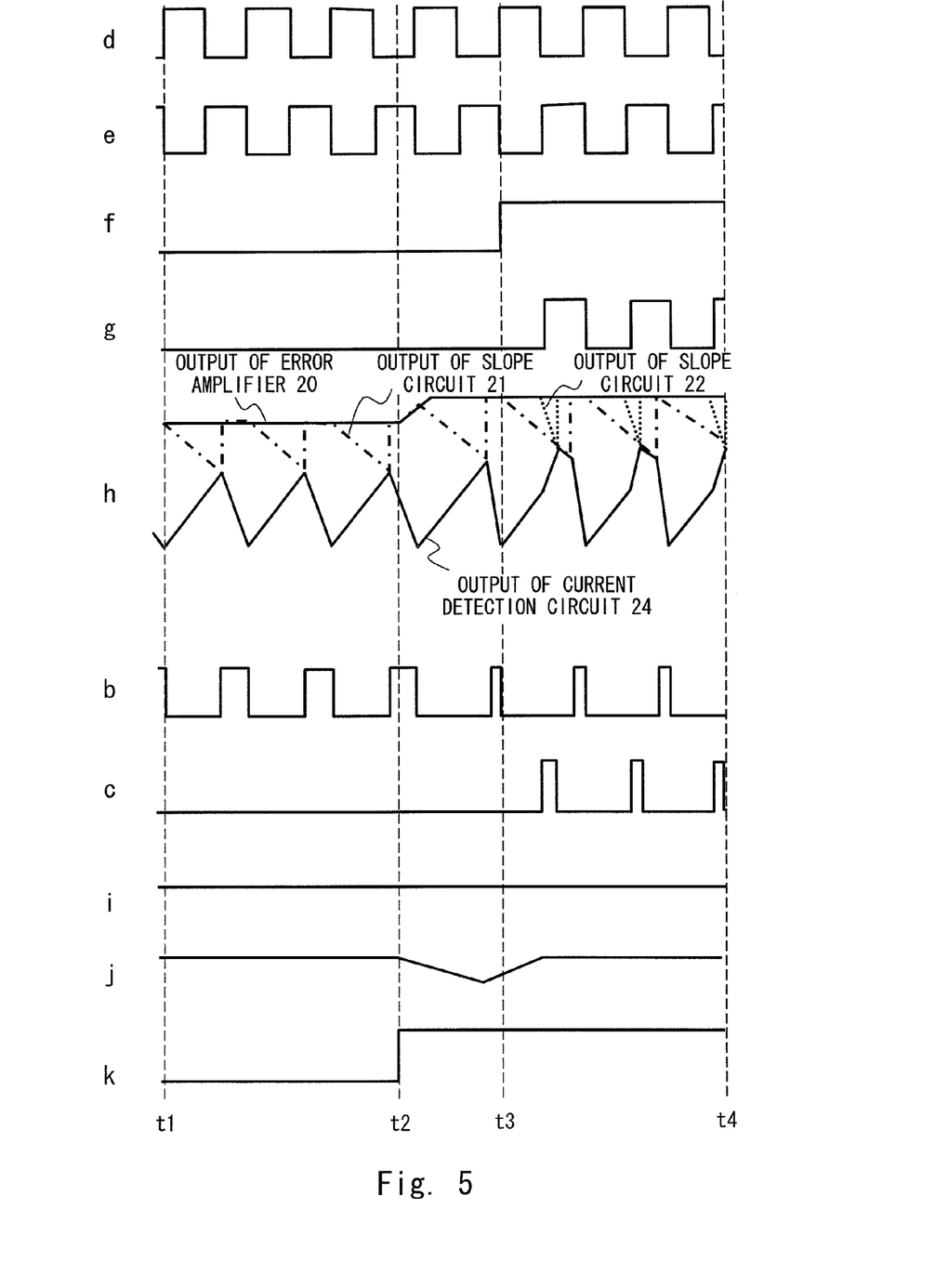
FIG. 5 is a graph for explaining an operation of a voltage boosting/lowering circuit according to a first embodiment of the present invention.

Next, an operation of a voltage boosting/lowering circuit according to the first embodiment of the present invention is explained with reference to FIG. 5. In particular, FIG. 5 is a timing chart of a case where the input voltage Vi and the output voltage Vo is "Vi≈Vo" and the load current changes. More strictly speaking, FIG. 5 is a timing chart of a case where "Vi>Vo" and their voltage difference is small, and the load current changes.

FIGS. 5d and 5e show output states of the voltage lowering clock and the voltage boosting clock respectively. FIG. 5f shows an output state of the duty detection signal. FIG. 5g shows an output state of the voltage boosting set signal. FIG. 5h shows output voltages of the error amplifier 20, the SLOPE circuit 21, the SLOPE circuit 22, and the current detection circuit 24 inside the switch control unit 12. FIGS. 5b and 5c show output states of the voltage lowering PWM signal and the voltage boosting PWM signal output to the transistor 2 and the transistor 7 respectively. FIGS. 5i, 5j and 5k show the input voltage Vi of the voltage boosting/lowering circuit, the output voltage Vo of the voltage boosting/lowering circuit, and the load current state respectively.

Firstly, a period from a time t1 to a time t2 in FIG. 5 is explained. Since the input voltage Vi, the output voltage Vo, and the load current are unchanged, the voltage lowering PWM signal has a constant duty. Further, assume that the duty of the low width of the voltage lowering PWM signal is 85% in FIG. 5. Assume that the duty detection circuit 32 is configured in such a manner that when the duty of the low width of the voltage lowering PWM signal is larger than 90%, the duty detection circuit 32 outputs an H-level signal, whereas when the duty is smaller than 90%, the duty detection circuit 32 outputs an L-level signal. Then, the duty detection circuit 32 outputs an L-level signal in this period. Since the duty detection signal is at the L-level, the selector 26 outputs an L-level signal and the voltage boosting set signal becomes an L-level signal.

Next, a period from a time t2 to a time t3 is explained. At a time t2, the load current changes from a small current state to a large current state. As the load current changes to the large current state, the output voltage Vo drops momentarily. Further, since the load current becomes larger, the current output from the choke coil 3 also increases and the voltage output from the current detection circuit 24 thereby increases. Further, as the output voltage Vo drops, the voltage output from the error amplifier 20 increases. Further, to restore the lowered output voltage Vo to the original voltage, the duty of the low width of the voltage lowering PWM signal increases. In FIG. 5, an assumption is made that the duty increases to 95%. Other signals including the duty detection signal, the voltage boosting set signal, the voltage boosting PWM signal, and the input voltage Vi do not change.

Next, a period from a time t3 to a time t4 is explained. At a time t3, in response to the increase of the duty of the low width of the voltage lowering PWM signal from 90%, which is the duty value in the period between the time t2 and t3, the duty detection circuit 32 raises its output voltage to an H-level. As the duty detection signal becomes the H-level, the selector 26 outputs the voltage boosting clock and the voltage boosting set signal becomes identical with the voltage boosting clock. Other signals including the voltage lowering PWM signal, the input voltage Vi, the output voltage Vo, and the load current do not change.

As explained above, the voltage boosting/lowering circuit according to the first embodiment of the present invention can detect the change in the load current by detecting the duty of the voltage lowering PWM signal, and can control the simultaneous operations of the voltage lowering circuit and the voltage boosting circuit by intermittently generating the voltage boosting set signal according to the detection result of the duty detection circuit. Consequently, the voltage boosting/lowering circuit according to the first embodiment of the present invention can alleviate the decrease of the power efficiency. That is, it is possible to perform an effective voltage boosting operation to increase the output voltage Vo that is otherwise lowered due to the increase of the load current. Further, when the load current does not increase as in the case of the period between the time t1 and t2, the voltage boosting operation is never performed. Therefore, the occurrence of the internal loss can be prevented.

Note that any value larger than 0% and no larger than 100% can be selected for the duty of the low width of the voltage lowering PWM signal, which is detected by the duty detection circuit, and the duty value may be determined as appropriate so that the required voltage boosting characteristic can be obtained.

Second Embodiment

Next, a configuration example of a voltage boosting/lowering circuit according to a second embodiment of the present invention is explained with reference to FIG. 6. The voltage boosting/lowering circuit includes an output voltage generation circuit 15, a switch control unit 43, a clock generation circuit 13, a selector 26, and a duty detection circuit 32. The output voltage generation circuit 15 is different from the output voltage generation circuit 15 shown in FIG. 1 in that the output voltage generation circuit 15 shown in FIG. 6 does not include the resistor 4. The other configurations are similar to those shown in FIG. 1, and therefore their detailed explanation is omitted. Further, the clock generation circuit 13, the selector 26, and the duty detection circuit 32 are the same as those shown in FIG. 1, and therefore their detailed explanation is omitted.

The switch control unit 43 includes an error amplifier 20, comparators 23 and 25, RS latches 27 and 28, inverters 29 to 31, and saw-tooth wave circuits 41 and 42. The differences from the switch control unit 12 shown in FIG. 1 are mainly explained hereinafter. Detailed explanation of configurations and operations similar to those of the switch control unit 12 shown in FIG. 1 is omitted.

The error amplifier 20 outputs a voltage value obtained by amplifying a difference between the feedback voltage represented as "a" and the reference voltage to the minus terminal of the comparator 23. The saw-tooth wave circuit 41 outputs a voltage to the plus terminal of the comparator 23. The saw-tooth wave circuit 41 increases its output voltage for a predetermined period, and then decreases the output voltage and outputs the decreased output voltage for a predetermined period. The saw-tooth wave circuit 41 controls its output voltage into a saw-tooth-like waveform and outputs the saw-tooth-like output voltage. Further, the saw-tooth wave circuit 41 outputs the saw-tooth-like waveform during the period in which the RS latch 27 outputs an H-level signal. The saw-tooth wave circuit 41 outputs a voltage having a constant voltage value during the period in which the RS latch 27 outputs an L-level signal. The configurations of the comparator 23, the RS latch 27, and the inverter 29 are similar to those shown in FIG. 1, and therefore their detailed explanation is omitted.

Similarly to the saw-tooth wave circuit 41, the saw-tooth wave circuit 42 outputs a saw-tooth-like waveform. However, the saw-tooth wave circuit 42 outputs a waveform having a more acute angle than that of the saw-tooth wave circuit 41. The configurations of the RS latch 28, the inverter 30, and the inverter 31 are similar to those shown in FIG. 1, and therefore their detailed explanation is omitted.

Figure 7:
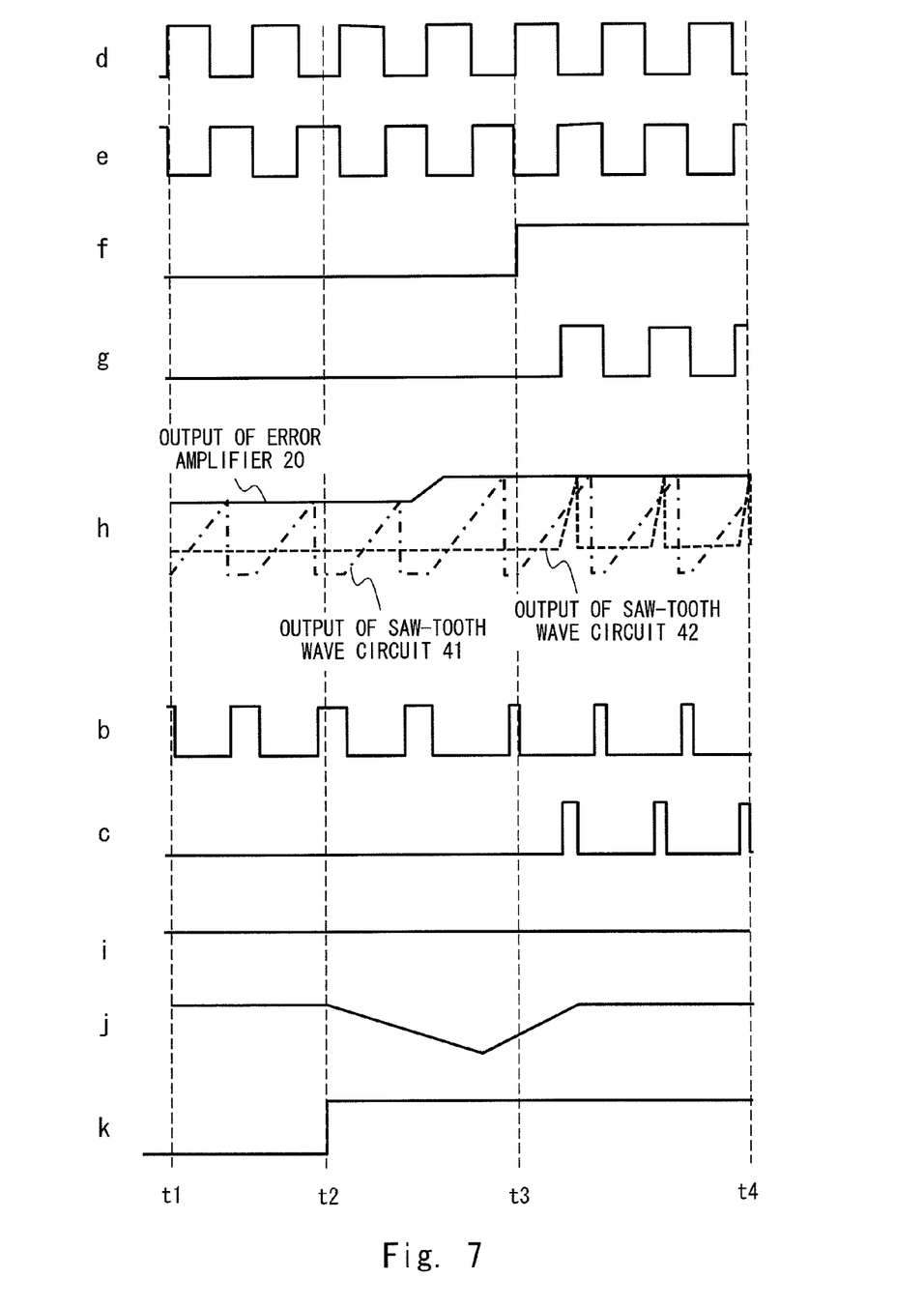
FIG. 7 is a graph for explaining an operation of a voltage boosting/lowering circuit according to a second embodiment of the present invention.

Next, an operation of a voltage boosting/lowering circuit according to the second embodiment of the present invention is explained with reference to FIG. 7. In particular, FIG. 7 is a timing chart of a case where the input voltage Vi and the output voltage Vo is "Vi≈Vo" and the load current changes. More strictly speaking, FIG. 7 is a timing chart of a case where "Vi>Vo" and their voltage difference is small, and the load current changes.

FIGS. 7b to 7g shows similar output states to those shown in FIG. 5, and therefore their detailed explanation is omitted. FIG. 7h shows output states of the error amplifier 20, the saw-tooth wave circuit 41, and the saw-tooth wave circuit 42.

Firstly, a period from a time t1 to a time t2 in FIG. 7 is explained. Since the input voltage Vi (represented symbol "i"), the output voltage Vo (represented symbol "j"), and the load current (represented symbol "k") are unchanged, the voltage lowering PWM signal has a constant duty. Further, assume that the duty of the low width of the voltage lowering PWM signal is 85% in FIG. 7. Assume that the duty detection circuit 32 is configured in such a manner that when the duty of the low width of the voltage lowering PWM signal is larger than 90%, the duty detection circuit 32 outputs an H-level signal, whereas when the duty is smaller than 90%, the duty detection circuit 32 outputs an L-level signal. Then, the duty detection circuit 32 outputs an L-level signal in this period. Since the duty detection signal is at the L-level, the selector 26 outputs an L-level signal and the voltage boosting set signal becomes an L-level signal.

Next, a period from a time t2 to a time t3 is explained. At a time t2, the load current changes from a small current state to a large current state. As the load current changes to the large current state, the output voltage Vo drops momentarily. Further, as the output voltage Vo drops, the voltage output from the error amplifier 20 increases. Note that in the voltage boosting/lowering circuit shown in FIG. 6, the detection of the current fluctuation using the resistor 4 is not performed. Therefore, the timing at which the output voltage of the error amplifier 20 increases is delayed in comparison to the voltage boosting/lowering circuit shown in FIG. 1. Further, to restore the lowered output voltage Vo to the original voltage, the duty of the low width of the voltage lowering PWM signal increases. In FIG. 5, an assumption is made that the duty increases to 95%. Other signals including the duty detection signal, the voltage boosting set signal, the voltage boosting PWM signal, and the input voltage Vi do not change.

Next, a period from a time t3 to a time t4 is explained. At a time t3, in response to the increase of the duty of the low width of the voltage lowering PWM signal from 90%, which is the duty value in the period between the time t2 and t3, the duty detection circuit 32 raises its output voltage to an H-level. As the duty detection signal becomes the H-level, the selector 26 outputs the voltage boosting clock and the voltage boosting set signal becomes identical with the voltage boosting clock. Other signals including the voltage lowering PWM signal, the input voltage Vi, the output voltage Vo, and the load current do not change.

As explained above, the voltage boosting/lowering circuit according to the second embodiment of the present invention can detect the change in the load current by detecting the duty of the voltage lowering PWM signal, and can control the simultaneous operations of the voltage lowering circuit and the voltage boosting circuit by intermittently generating the voltage boosting set signal according to the detection result of the duty detection circuit. Consequently, the voltage boosting/lowering circuit according to the second embodiment of the present invention can alleviate the decrease of the power efficiency. That is, it is possible to perform an effective voltage boosting operation to increase the output voltage Vo that is otherwise lowered due to the increase of the load current. Further, when the load current does not increase as in the case of the period between the time t1 and t2, the voltage boosting operation is never performed. Therefore, the occurrence of the internal loss can be prevented.

Figure 6:
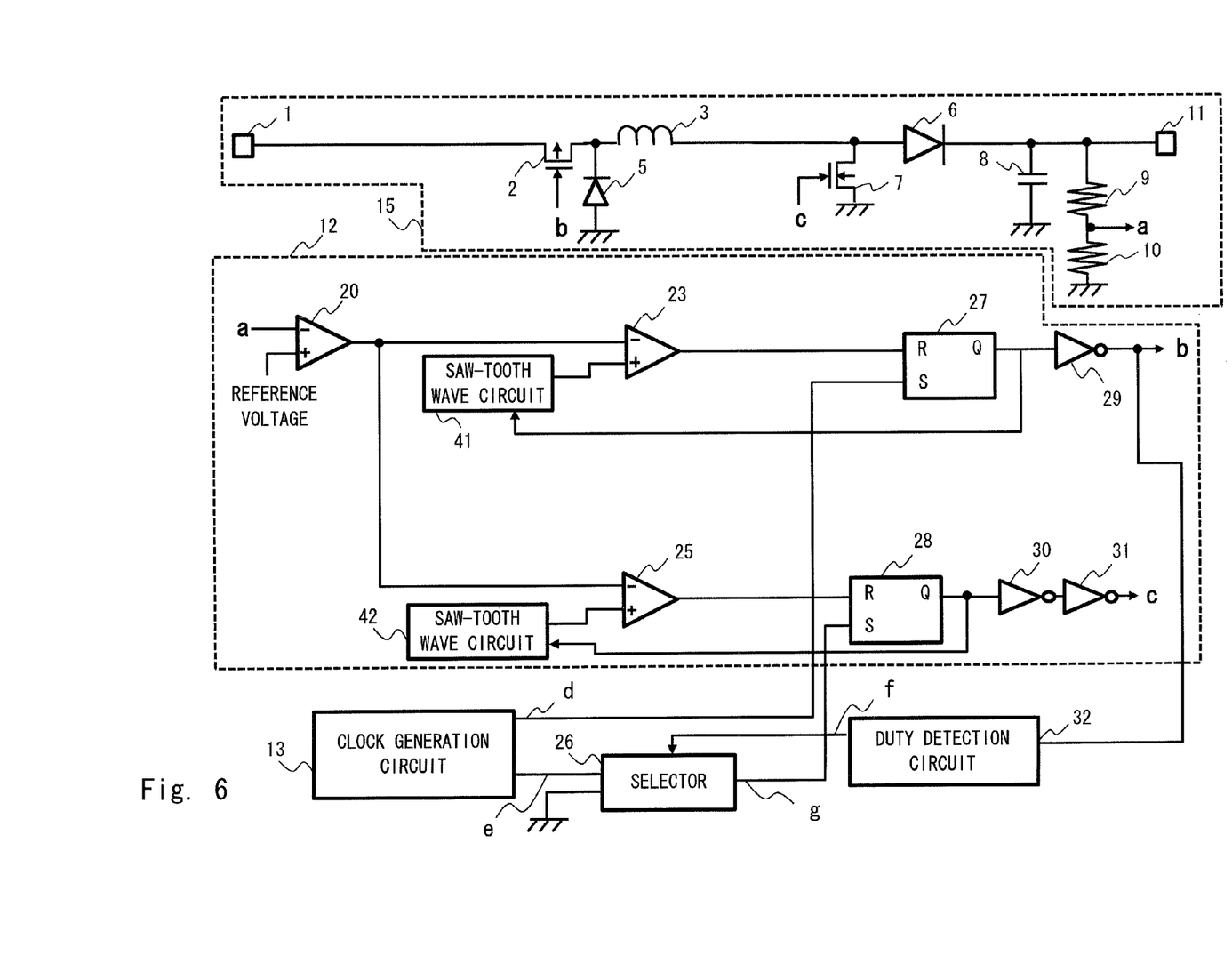
FIG. 6 is a configuration diagram of a voltage boosting/lowering circuit according to a second embodiment of the present invention.

Further, although the timing at which the output voltage of the error amplifier 20 increases is delayed in comparison to the voltage boosting/lowering circuit shown in FIG. 1 because the voltage boosting/lowering circuit shown in FIG. 6 does not include the resistor 4, the voltage boosting/lowering circuit shown in FIG. 6 can be implemented with simpler circuit configuration because the voltage boosting/lowering circuit shown in FIG. 6 does not include the resistor 4.

Note that the present invention is not limited to the above-described embodiments, and various modifications can be made as appropriate without departing from the spirit and scope of the present invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first and second embodiments can be combined as desirable by one of ordinary skill in the art.

What is claimed is:

1. A voltage boosting/lowering circuit comprising:
an output voltage generation circuit comprising a first switch element connected between an input terminal and one end of a choke coil, and a second switch element connected between another end of the choke coil and a ground terminal, the output voltage generation circuit being configured to generate an output voltage by switching the first and second switch elements between an on-state and an off-state and thereby boosting or lowering an input voltage input to the input terminal;
a first switch control unit that outputs a first pulse signal to the first switch element, the first pulse signal being used to switch the first switch element between an on-state and an off-state;
a duty detection circuit that detects a duty of the first pulse signal; and
a second switch control unit that outputs a second pulse signal to the second switch element, the second pulse signal being used to switch the second switch element between an on-state and an off-state according to the detected duty.

2. The voltage boosting/lowering circuit according to claim 1, further comprising a clock signal generation unit that generates a first clock signal used to generate the first pulse signal, and a second clock signal used to generate the second pulse signal, the second clock signal having a different phase from that of the first clock signal.

3. The voltage boosting/lowering circuit according to claim 2, further comprising a selector circuit that outputs the second clock signal to the second switch control unit when a duty detected in the duty detection circuit is equal to or greater than a predefined value, and outputs a ground potential when the duty detected in the duty detection circuit is smaller than the predefined value.

4. The voltage boosting/lowering circuit according to claim 1, wherein
the first switch control unit lowers an input voltage by switching the first switch element between an on-state and an off-state while the second switch element is in an off-state, and
the second switch control unit boosts the input voltage by switching the second switch element between an on-state and an off-state while the first switch element is in an off-state.

5. The voltage boosting/lowering circuit according to claim 1, further comprising:
an error amplifier that amplifies and outputs a difference between a feedback voltage determined based on the output voltage and a first reference voltage determined based on a target output voltage; and
a current detection circuit that generates a second reference voltage determined based on a change in a current output from the choke coil,
wherein the first and second switch control units switch the first and second switch elements between an on-state and an off-state based on an output result of the error amplifier and the current detection circuit.

6. A control method of a voltage boosting/lowering circuit comprising a first switch element connected between an input terminal and one end of a choke coil, and a second switch element connected between another end of the choke coil and a ground terminal, the control method comprising:
outputting a first pulse signal to the first switch element, the first pulse signal being used to switch the first switch element between an on-state and an off-state;
detecting a duty of the first pulse signal; and
outputting a second pulse signal to the second switch element, the second pulse signal being used to switch the second switch element between an on-state and an off-state according to the detected duty.

7. The voltage boosting/lowering circuit according to claim 1, wherein the first switch control unit that outputs the first pulse signal to the duty detection circuit.

8. The voltage boosting/lowering circuit according to claim 1, further comprising a selector circuit that outputs a voltage boosting signal used for based on the detected duty, wherein the second switch control unit uses the voltage boosting signal to change a value of the second pulse signal.

9. The control method according to claim 6, further comprising outputting the first pulse signal to a duty detecting circuit that is used to for detecting the duty of the first pulse signal.

10. The control method according to claim 6, further comprising:
outputting a voltage boosting signal based on the detected duty; and
changing a value of the second pulse signal based on the voltage boosting signal.

11. A voltage boosting/lowering circuit comprising:
a first switch that receives a first signal for controlling an on-state and an off-state of the first switch;
a second switch that receives a second signal for controlling an on-state and an off-state of the second switch;
a choke coil that is connected between the first switch and the second switch;
a duty detection circuit that receives the first signal and detects a duty of the first signal;
a first switch control unit that outputs the first signal to the first switch; and
a second switch control unit that controls an value of the second signal based on the detected duty of the first signal.

12. The voltage boosting/lower circuit according to claim 11, further comprising:
an input terminal that receives an input voltage, the first switch is connected between the input terminal and the choke coil; and
an output terminal that outputs an output voltage, wherein the first switch element and the second switch element are switch between their on-state and their off-state to generate the output voltage.

* * * * *